(12) United States Patent
Auhagen

(10) Patent No.: US 7,657,600 B2
(45) Date of Patent: Feb. 2, 2010

(54) RESPONDING TO ELECTRONIC MAIL MESSAGES

(75) Inventor: Gero Auhagen, Mountain View, CA (US)

(73) Assignee: SAP Aktiengesellschaft, Walldorf (DE)

( * ) Notice: Subject to any disclaimer, the term of this patent is extended or adjusted under 35 U.S.C. 154(b) by 676 days.

(21) Appl. No.: 11/027,569

(22) Filed: Jan. 3, 2005

(65) Prior Publication Data
US 2006/0149819 A1 Jul. 6, 2006

(51) Int. Cl.
G06F 15/16 (2006.01)
(52) U.S. Cl. ................... 709/206; 709/205; 709/207
(58) Field of Classification Search ................ 709/206, 709/207
See application file for complete search history.

(56) References Cited

U.S. PATENT DOCUMENTS

| | | | |
|---|---|---|---|
| 6,718,368 B1* | 4/2004 | Ayyadurai | 709/206 |
| 7,313,385 B2* | 12/2007 | Yabe et al. | 715/752 |
| 2002/0091777 A1* | 7/2002 | Schwartz | 709/206 |
| 2002/0174170 A1* | 11/2002 | Ioffe et al. | 709/201 |
| 2002/0194307 A1* | 12/2002 | Anderson et al. | 709/219 |
| 2005/0021636 A1* | 1/2005 | Kumar | 709/206 |
| 2005/0066005 A1* | 3/2005 | Paul | 709/206 |
| 2005/0076090 A1* | 4/2005 | Thuerk | 709/207 |
| 2005/0223062 A1* | 10/2005 | Doan et al. | 709/206 |
| 2005/0223070 A1* | 10/2005 | Ordille et al. | 709/206 |
| 2006/0149819 A1* | 7/2006 | Auhagen | 709/206 |

OTHER PUBLICATIONS

Frequently Asked Questions—MailChamp, obtained from the Internet at http://www.mailchamp.com/faq.phtml, on Nov. 3, 2004, 7 pages.
Frequently Asked Questions—ReadNotify.com, obtained from the Internet at http://www.readnotify.com/readnotify/faq.asp, on Nov. 3, 2004, 20 pages.
Information page on DidTheyReadit?, obtained from the Internet at http://www.didtheyreadit.com/index.php/html/howitworks, on Nov. 3, 2004, 6 pages.

* cited by examiner

Primary Examiner—Michael Won
(74) Attorney, Agent, or Firm—Fish & Richardson P.C.

(57) ABSTRACT

One implementation provides a method of replying to a user electronic mail (email) message sent from a user within a system that processes incoming user email messages and delivers responses to these incoming user email messages. The method includes processing a user email message sent from a user to determine its content. A response based on the content of the user email message is then created. The response is delivered to the user along with a request for feedback regarding quality of the response to the user. Any returned feedback from the user is received. The returned feedback or an absence of returned feedback within a predetermined period of time is processed to determine if additional response is to be sent to the user.

8 Claims, 6 Drawing Sheets

RESPONDING TO ELECTRONIC MAIL MESSAGES

TECHNICAL FIELD

This description relates to computing systems that manage electronic mail messages.

BACKGROUND

Increasingly, electronic mail (email) based service departments are replacing telephone-based service departments. Often, a customer or other end user who encounters difficulties when trying to solve a problem sends an email message to an email message-based service department. An agent within the service department often replies to the message from the customer or end user with a response based on the information the customer or end user provides in the email message. The agent may use a standard response from a database in his or her reply. For example, a refrigerator customer might send an email message to a refrigerator service provider to inquire about a poorly functioning auto-defrost feature. An agent within the service department may respond with a standard response from a database that discusses auto-defrost problems.

In large companies, a service department may receive hundreds or thousands of email messages each day from customers or end users requesting assistance. Many times, these email messages are initially received by an email response management system (ERMS). An ERMS may analyze the email message to determine its content, search a database for a possible response based on the content of the email message, and route the email message to a service agent that is likely able to respond to the email message.

Some ERMS systems have the capability to "auto-respond." In an auto-response system, the ERMS may create a response and send it to the customer without intervention from a human agent. The capability to send auto-responses to customers can generate significant cost savings for a service department by reducing the number of service agents needed at any given time. However, because auto-responses are prone to error, there is often a tradeoff between the low cost of auto-responses and customer satisfaction. Customers may not have patience for inaccurate or irrelevant auto-responses. Poor responses waste a customer's time, cause frustration and damage the customer relationship. The harm caused by damaging the customer relationship may outweigh any cost savings.

Some ERMS systems create auto-responses and then send them to human service agents for review, to improve the overall response quality. Other systems can be configured to send auto-responses directly to the customer only when the content of the customer email message falls in a very limited subject area. These auto-responses are usually only sent when the likelihood of inaccurate responses is low or when the likelihood that the customer relationship will be adversely impacted by an inaccurate response is low. Current ERMS systems may not efficiently balance the low cost of auto-responses with customer satisfaction.

SUMMARY

Various implementations relate to systems that process incoming user electronic mail (email) messages and deliver responses to these incoming user email messages. In a first general aspect, a method of replying to a customer or end user (hereafter, "user") email message sent from a user includes processing the user email message to determine its content. A response based on the content of the user email message is then created. The response is delivered to the user along with a request for feedback regarding quality of the response to the user. Any returned feedback from the user is received. The returned feedback or an absence of returned feedback within a predetermined period of time is processed to determine if additional response is to be sent to the user. An additional response to be sent to the user may include sending a subsequent email message to the user.

In some implementations, the response is created automatically by the ERMS, without human intervention. In some implementations, the ERMS may create the response based on input received from a human agent. Delivering the response to the user may include storing the response in a database, sending a link to the user (where the link references the response stored in the database), receiving a request for the response when the user accesses the link, and sending the response to the user in response to the request. In some implementations, the request for feedback includes hypertext markup language (HTML) instruction code.

Advantages of various implementations described in this document may include any or all of the following. Some implementations may balance the low cost nature of auto-responses with the potential error in auto-responses and the possibility of corresponding damage to the user relationship. Some implementations may provide a method for the user to provide immediate feedback on the quality and helpfulness of an auto-response. Some implementations may provide a method to enable subsequent follow-up if an initial auto-response is not helpful to the user.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
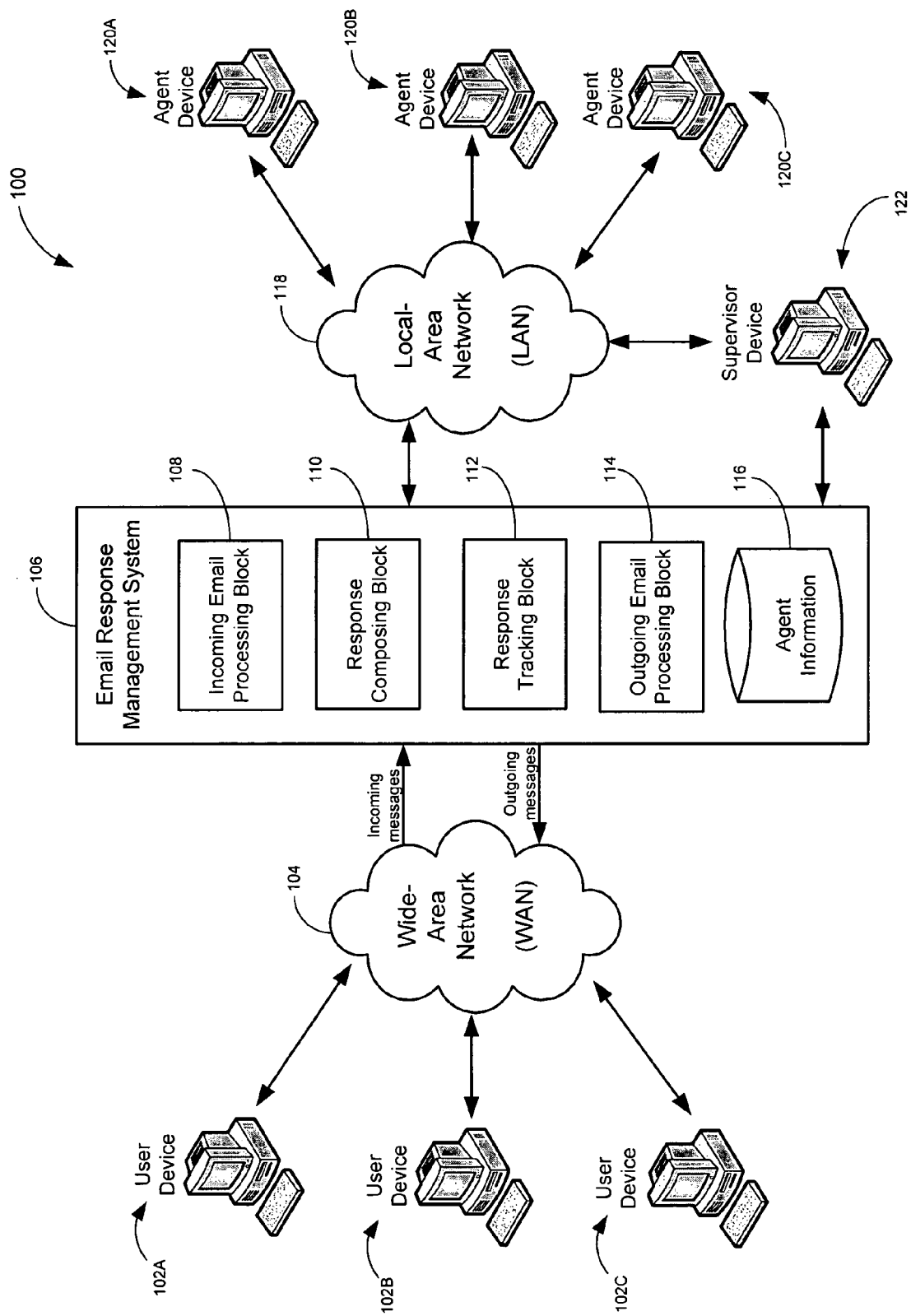
FIG. 1A is a block diagram of an overall environment in which an email response management system (ERMS) can function, according to one implementation.

FIG. 1A is a block diagram of the overall environment 100 in which an email response management system (ERMS) 106 can function, according to one implementation. In this implementation, the ERMS 106 may be used to reply to an electronic mail (email) message sent by a user from user device 102A, 102B or 102C. In replying to the email message, the ERMS 106 may request feedback from the user regarding quality of the reply. The ERMS 106 may receive any feedback from the user and may send an additional response based on the received feedback.

In one implementation, user devices 102A-C are coupled to a wide-area network (WAN) 104, such as the Internet or a wireless network. Also connected to the WAN 104 is the ERMS 106, capable of receiving user email messages, processing them, responding to them and tracking the responses. In one implementation, the ERMS 106 runs on a computer device of the type shown in FIG. 4. The ERMS 106 may also be coupled to a local-area network (LAN) 118, such as a company's Ethernet network. Agent devices 120A, 120B and 120C may connect to the ERMS 106 through the LAN 118. For example, agents may use agent devices 120A-C to connect to the ERMS 106 through the LAN 118. In this manner, agents may direct and participate in the email message processing and response processing performed by the ERMS 106.

In one implementation, the ERMS 106 is coupled to a separate supervisor device 122 through which a supervisor or administrator may interact with the ERMS 106. The supervisor device 122 may connect directly to the ERMS 106, or it may connect to the ERMS 106 through the LAN 118. Through the supervisor device 122, a supervisor or administrator may have more control over the functioning of the ERMS 106 than through an agent device 120A, 120B or 120C.

In one implementation, the ERMS 106 receives, through the WAN 104, a user email message from a user employing a user device 102A, 102B or 102C. The ERMS 106, via an incoming email message processing block 108, receives the incoming email message and processes it to determine its content, as further described in FIG. 1B. The ERMS 106 may store information about the message in a database, via a response tracking block 112.

Based on the content of the user email message, the ERMS 106 creates a response to the user email message using a response composing block 110, according to one implementation, as is further described with reference to FIG. 1B. In one implementation, the ERMS 106 creates the response automatically, without human intervention. In one implementation, the ERMS 106 receives input from a human agent using one of the agent devices 120A, 120B or 120C that specifies a basis for the response. In one implementation, the ERMS 106 creates the response by combining automatic action from the ERMS 106 with action from a human agent using one of the agent devices 120A, 120B or 120C. In this implementation, the ERMS 106 creates at least a portion of the response without human intervention. The ERMS 106 may store information about the response in the response tracking block 112.

Figure 3:
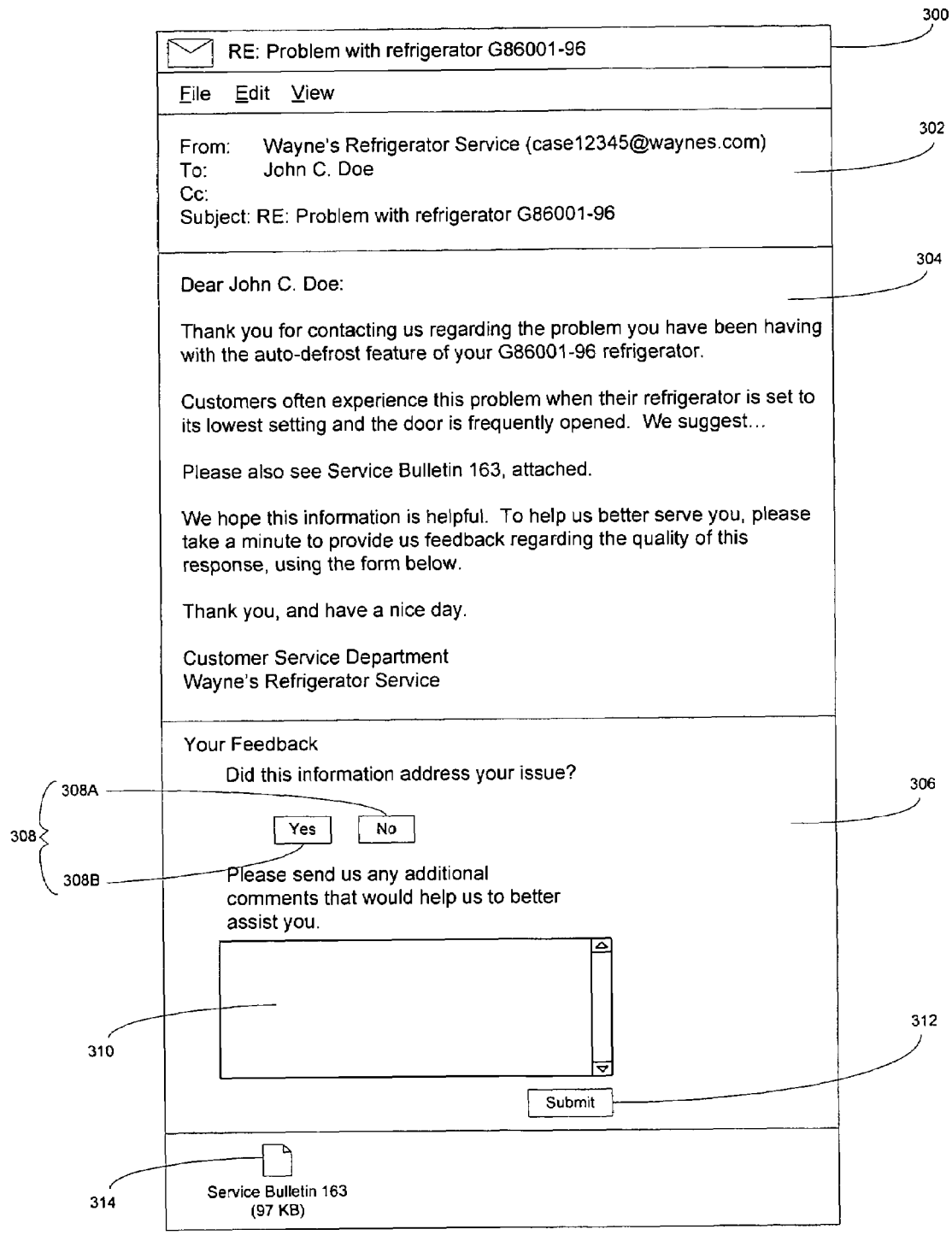
FIG. 3 is a diagram of an email message that can be created by the ERMS shown in FIG. 1A or FIG. 1B.

An outgoing email message processing block 114 prepares the response for delivery to the user and appends a request for feedback from the user regarding the quality of the response, according to one implementation. FIG. 3 provides one example of a response with a request for user feedback. In one implementation, the response to the user may include hypertext markup language (HTML) content that can be used to receive user feedback. Here, some of the HTML content may remain on a content processing server 144 (shown in FIG. 1B) in the outgoing email message processing block 114. When the user reads the response, a request for the HTML content remaining on the content processing server 144 may be sent to the content processing server 144, which then may deliver the HTML content.

The content processing server 144 may also receive feedback from the user that is solicited from the delivered HTML content. Once user feedback is received, the ERMS 106 may use the outgoing email message processing block 114 and the response tracking block 112 to provide further routing and processing of the user message. In one implementation, the ERMS 106, after receiving feedback from the user, may create an additional response automatically, without human intervention. In one implementation, the ERMS 106 may route the response and the feedback to an agent using one of the agent devices 120A, 120B or 120C. In one implementation, the ERMS 106 may create the additional response by combining automatic action from the ERMS 106 with action from a human agent using an agent device 120A, 120B or 120C. In this implementation, the ERMS 106 creates at least a portion of the additional response without human intervention. In one implementation, the ERMS 106 receives input from a human agent that specifies a basis for the additional response.

To route the response and feedback to the agent, the ERMS 106 may use agent information 116, which can include information about expertise of each agent. The ERMS 106 can use the agent information 116 to route messages and responses to particular agents who will most likely be able to create an additional response. A supervisor or administrator using the supervisor device 122 may be able to modify the agent information 116 to affect how messages are to be routed.

Figure 1B:
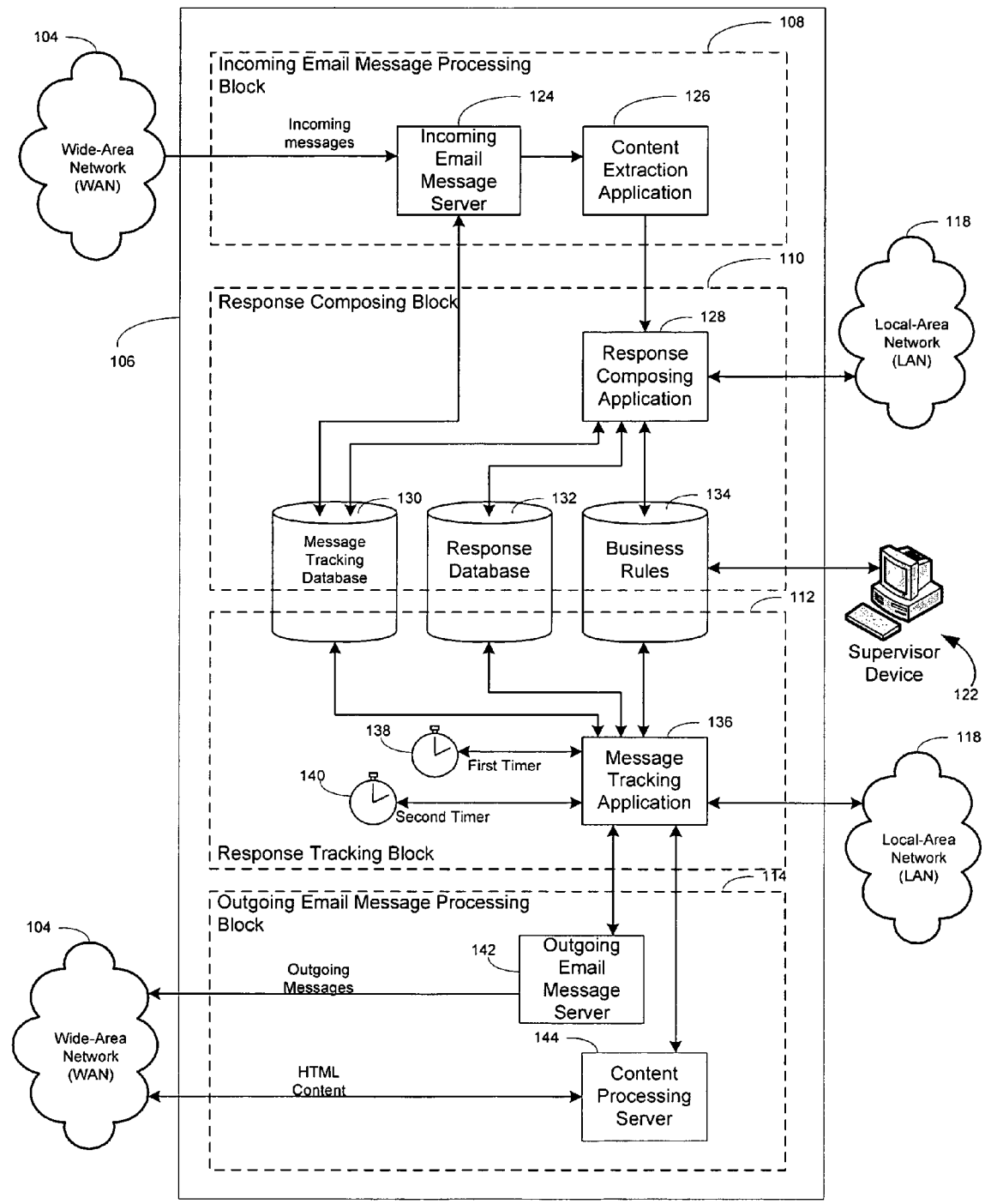
FIG. 1B is a block diagram showing additional details of the ERMS shown in FIG. 1A, according to one implementation.

FIG. 1B is a block diagram showing additional details of the ERMS 106 shown in FIG. 1A, according to one implementation. The incoming email message processing block 108, in one implementation, includes an incoming email message server 124 and a content extraction application 126. The incoming email message server 124 is connected to the WAN 104 and is capable of receiving email messages in various formats from users through the WAN 104. For example, the incoming email message server 124 may be a Post Office protocol 3 (POP3) server, and it may receive email messages in plain text format, in HTML format, or in other email message formats. In one implementation, the incoming email message server 124 is connected to a message tracking database 130. In this implementation, the ERMS 106 stores user email messages in the message tracking database 130 in the response composing block 110. The ERMS 106 may also store other information that is generated during the processing of the email message in the message tracking database 130, as will be described in greater detail below. The incoming email message server 124 is accessible by a content extraction application 126.

The ERMS 106 uses the content extraction application 126 to analyze an email message to determine its content. Analyzing the message to determine its content may include keyword analysis, natural language processing, or other content extraction methods. The operation of the content extraction application 126 is further described with reference to a typical email message, provided in Table 1.

TABLE 1

| Typical User Email Message | |
|---|---|
| TO: | help@waynes.com |
| FROM: | John C. Doe [johncdoe@isp.com] |
| SUBJECT: | Problem with refrigerator G86001-96 |
| MESSAGE: | Frost has been accumulating recently in my G86001-96 refrigerator, even though my model has an auto-defrost feature. Please advise me as to how I can remedy this problem. As a result of the growing frost build-up, I am having difficulty closing the door to my refrigerator. Thanks, John C. Doe |

Referring to the typical email message provided in Table 1, the ERMS 106 may run the content extraction application 126 to determine the content of the email message. Here, the ERMS 106 determines that the email message refers to a G86001-96 model refrigerator and to problems with an auto-defrost feature. The ERMS 106 can use this content information to create a response in the response composing block 110.

The response composing block 110, in one implementation, includes a response composing application 128, the message tracking database 130, a response database 132 and business rules 134. The response database 132 may include solutions to common problems or responses to common inquiries received by the ERMS 106. For example, the response database 132 may include several solutions for common problems related to a G86001-96 refrigerator. More specifically, the response database 132 may include a solution for auto-defrost problems in a G86001-96 refrigerator. The contents of the response database 132 may be initially created and stored in the database by agents using the agent devices 120A-C that are connected to the LAN 118. Or, the contents of the response database 132 may be automatically created by the ERMS 106 based on email message responses created by human agents. For example, the ERMS 106 may adaptively "learn" responses entered by human agents and store those responses in the response database 132 for future use. Agents, using agent devices 120A-C, may periodically update the contents of the response database 132. Supervisors or administrators may also update the contents of the response database 132 through the supervisor device 122. The ERMS 106 may also automatically update the contents. The contents of the response database 132 may be indexed by topic.

In one implementation, the ERMS 106 runs the response composing application 128 to search for a solution among the solutions stored in the response database 132, based on the content it extracted by running the content extraction application 126. For example, referring again to the typical email message that is shown in Table 1, the ERMS 106 may search the response database 132 for a solution related to the auto-defrost feature on a G86001-96 refrigerator. Upon finding a solution, the ERMS 106 may retrieve the solution and create a response that incorporates the solution. The ERMS 106 may then store the response in the message tracking database 130.

Figure 1C:
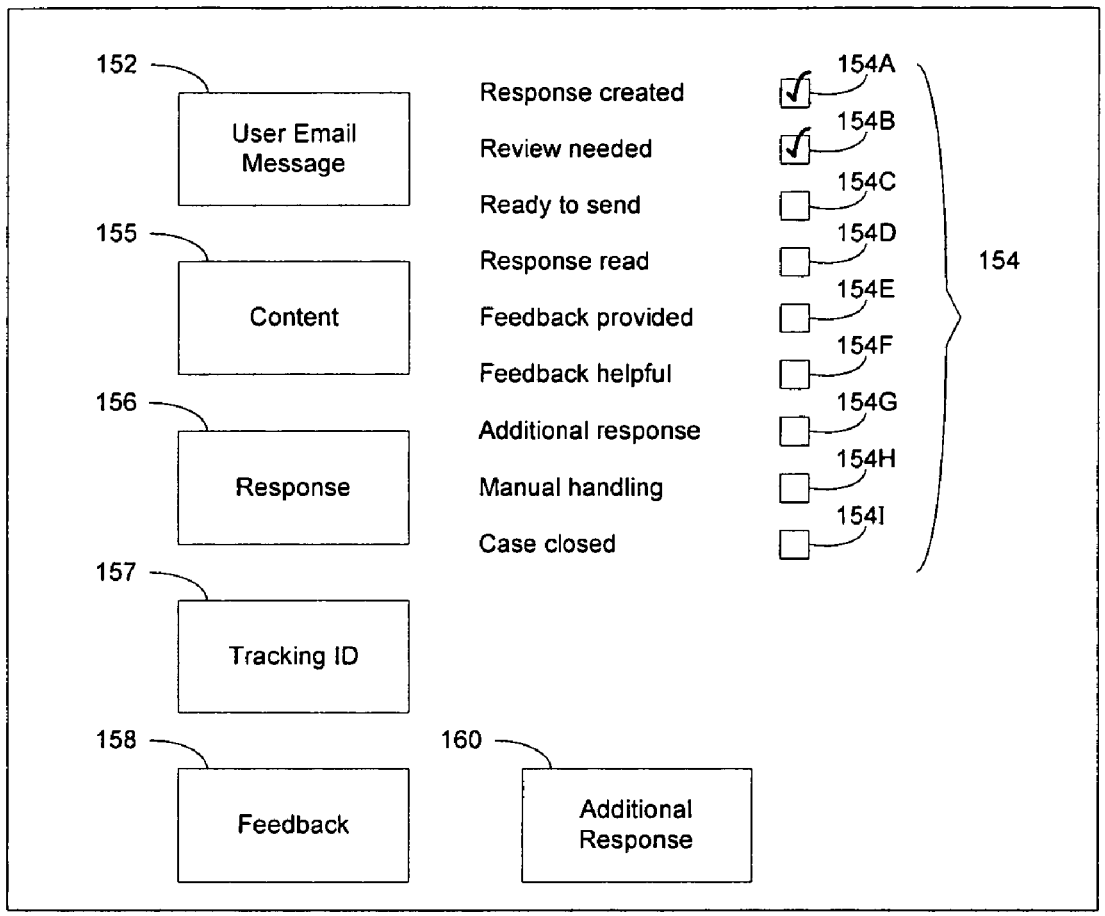
FIG. 1C shows details of a database entry that may be stored in a message tracking database that is shown in FIG. 1B, according to one implementation.

The ERMS 106 may use the message tracking database 130 to store other information related to a user email message. When the ERMS 106 receives a new message, a new entry may be created in the message tracking database 130. The entry may include the message itself and status information that the ERMS 106 can use to track the state of the response process. In one implementation, this status information may be stored in the form of flags. For example, the ERMS 106 may use a flag to indicate that a response has been created and another flag to indicate that it is ready to be sent. FIG. 1C further illustrates how the ERMS 106 could use flags to track and manage the process of creating a response to a user message. The status information may include a tracking ID for the ERMS 106 to use throughout the process of creating, sending and tracking the response to the user. A tracking ID, according to one implementation, is shown in FIG. 1C.

The ERMS 106 may use business rules 134 to determine which actions to take at various points in creating and processing a response to the user email message. For example, the ERMS 106 may automatically respond to some types of user email messages without any intervention by human agents. For other types of email messages, human agents may need to review the response before it is sent to the user. Whether human intervention is required may be stored in the business rules 134. In creating a response to a user email message, the ERMS 106 may run the response composing application 128 to retrieve a business rule from the business rules 134 and compose the message according to the rule. If, based on the execution of the business rule, the ERMS 106 determines that human agent review of the response is needed, the ERMS 106 may prompt a human agent using one of the agent devices 120A, 120B or 120C to review the response. The ERMS 106 may execute a business rule in conjunction with the agent information 116 to determine how to route the response for review.

The response tracking block 112, in one implementation, includes a message tracking application 136, a first timer 138 and a second timer 140. The response tracking block 112 also incorporates the message tracking database 130, the response database 132 and the business rules 134. The ERMS 106 uses the message tracking application 136 to monitor messages in the message tracking database 130, in one implementation. The ERMS 106 may run the message tracking application 136 to monitor flags in the message tracking database 130 to identify messages that are ready to be sent. The ERMS 106 may forward such messages to the outgoing email message processing block 114 for delivery to the user. The ERMS 106 may use the first timer 138 and the second timer 140 to track user handling of the response after it is sent, as is further explained with reference to FIG. 2.

The outgoing email message processing block, in one implementation, includes an outgoing email message server 142 and a content processing server 144. The outgoing email message server 142 is capable of delivering the email message response to the user through the WAN 104 in various formats. For example, the outgoing email message server 142 may be a Simple Mail Transfer Protocol (SMTP) server, capable of delivering plain text and HTML email messages.

The content processing server 144 is capable of delivering a request for feedback to the user and of processing any response received back from the user. For example, if the email message response is sent in HTML format, the outgoing email message server 142 may send a link to the user, where the link references content that is accessible by the content processing server 144. When the user reads the response, according to one implementation, HTML instructions within the message send a request to the content processing server 144 to deliver the content of the email message response to the user. In response to the request, the content processing server 144 delivers the content. The content processing server 144 may also receive feedback from the user. For example, the content processing server may receive HTML feedback that the email message response was helpful to the user. Or, the content processing server 144 may receive HTML feedback that the email message response was not helpful. In response to the latter case, the ERMS 106 may use the content processing server 144, the response tracking block 112 and the response composing block 110 to create and send an additional response to the user or to take other action. For example, the ERMS 106 may automatically create and send the additional response. As another example, the ERMS 106 may route the feedback to a particular agent using one of the agent devices 120A, 120B or 120C, based on the agent information 116 and the business rules 134.

FIG. 1C shows details of a database entry 150 that may be stored in the message tracking database 130 that is shown in FIG. 1B, according to one implementation. The database entry 150 may include a user email message 152. The database entry may also include a series of flags 154 that the ERMS 106 can use to track the progress of the response process. For example, the database entry may include a response-created flag 154A (schematically illustrated in FIG. 1C by a checkmark) to indicate that the ERMS 106 has created a response. A review-needed flag 154B may indicate that human agent review is needed before the response can be sent. A ready-to-send flag 154C may indicate that the response is ready to be sent. If the review-needed flag 154B were set, the ready-to-send flag 154C indicating readiness to send the response would not be set until the human agent actually reviewed the response, according to one implementation. A response-read flag 154D may indicate that the user has read the response. A feedback-provided flag 154E may indicate that the user has provided feedback. A feedback-helpful flag 154F may indicate that the feedback shows that the response was helpful to the user. An additional-response flag 154G may indicate that additional response is to be sent. Such a flag might be set following the receipt of feedback indicating that the response was not helpful. A manual-handling flag 154H may indicate that handling by a human agent is required. This flag might be set after a second response is unhelpful to a user, or in other circumstances that require special handling. A case-closed flag 154I may indicate that processing related to the user email message is "closed" and that no further processing is required for the user email message or for the response. The database entry 150 may include other flags for the ERMS 106 to use in processing the response.

The database entry 150 may also include content 155 of the user email message 152, as extracted by the ERMS 106 running the content extraction application 126. The database entry 150 may also include a response 156. The response 156 could be a response that the ERMS 106 created automatically based on the content, or it could be a response created based on input from a human agent. The database entry 150 may also include a tracking ID 157. The ERMS 106 may create and store the tracking ID 157 when the response 156 is created and stored, when the user email message 152 is received and stored, or at some other time. The database entry 150 may also include any feedback 158 that the ERMS 106 receives back from the user and any additional response 160 that the ERMS 106 creates.

The above description of one implementation of a message tracking database entry 150 is only one way the ERMS 106 can track status information. Upon reading this description, one skilled in the art will appreciate that the ERMS 106 could track status information related to message response processing in other ways without departing from the spirit of this description.

Figure 2:
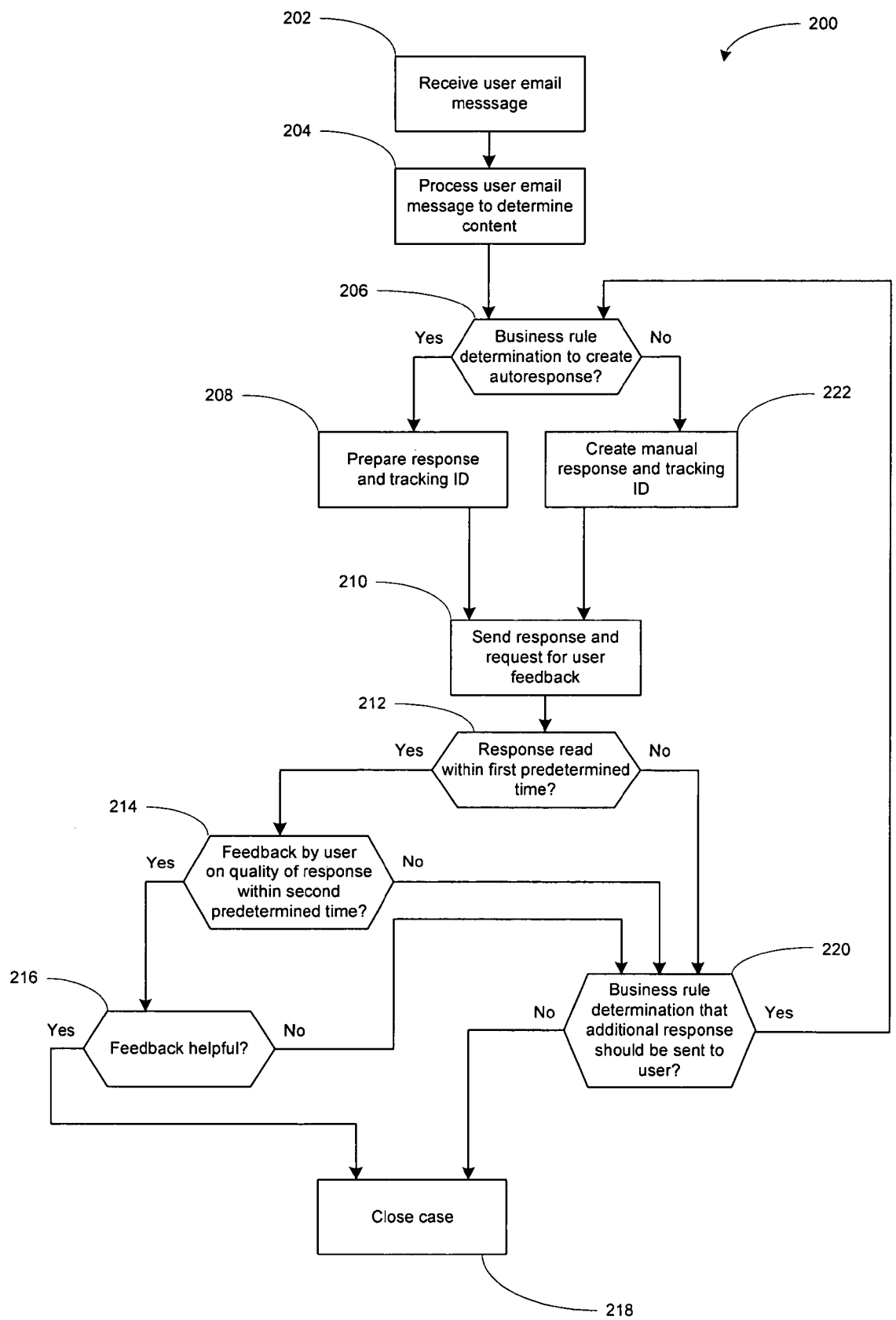
FIG. 2 is a flow diagram of a method the ERMS shown in FIG. 1A or FIG. 1B can use to receive, process, respond to and track a user email message, according to one implementation.

FIG. 2 is a flow diagram of a method 200 the ERMS 106 shown in FIG. 1A or FIG. 1B can use to receive, process, respond to and track a user email message, according to one implementation. The method 200 may be performed in the system 100. For example, a computer program product can include instructions that cause a processor of the ERMS 106 to perform the actions of method 200.

In an action 202, the ERMS 106 receives a user email message at its incoming email message server 124. Upon receiving the user email message, the ERMS 106 may store it in the message tracking database 130. For example, the ERMS 106 may store a copy of the message 152 in the database entry 150.

In an action 204, the ERMS 106 processes the received user email message to determine its content. For example, the ERMS 106 may run the content extraction application 126 to determine the content of the user email message. The ERMS 106 may subsequently store the determined content 155 in the database entry 150 associated with the user message.

In an action 206, the ERMS 106 determines whether to automatically create a response to the user email message or to prompt a human agent to enter input for creating the response. For example, the ERMS 106 may run the response composing application 128 to load and execute a business rule 134. By executing the business rule 134, the ERMS 106 may determine whether to automatically create a response or to prompt a human agent to enter input for creating a response. If, by executing the business rule 134, the ERMS 106 determines to create a response automatically, the ERMS 106 may run the response composing application 128 to retrieve a solution from the response database 132. The solution may be retrieved, based on the content of the user email message. The ERMS 106 may then, in an action 208, prepare a response that incorporates the retrieved solution, and store the response 156 in the message tracking database entry 150. If, by executing the business rule 134, the ERMS 106 determines that a human agent should enter input for creating the response, the ERMS 106 may prompt the human agent using one of the agent devices 120A-C to enter input that specifies a basis for the response. Upon receipt of the input, the ERMS 106 may create a response that incorporates the input, in an action 222. Subsequently, the ERMS 106 may store the response 156 in the message tracking database entry 150. In an action 208, or in an action 222, the ERMS 106 may store tracking information along with the response in the message tracking database 130. For example, the ERMS 106 may assign a tracking ID 157 to the message and response. The tracking ID 157 could also be created and stored in the database entry 150 when the user email message 152 is stored there. The ERMS 106 may also set a response-created flag 154B, a ready-to-send flag 154C, or another appropriate flag.

In an action 210, the ERMS 106 sends the response to the user. For example, the ERMS 106 may run the message tracking application 136 to monitor the message tracking database 130 for a response that is ready to be sent to the user. In one implementation, that may be a response that has set the ready-to-send flag 154C. Upon identifying such a message, the ERMS 106 may deliver the response to the user via the outgoing email message server 142.

In an action 212, after sending the response to the user, the ERMS 106 tracks whether the user reads the response within a first predetermined time. For example, the ERMS 106 may set the first timer 138 upon sending the response. In one implementation, the sent response includes only a link to the response accessible by the content processing server 144. When the user reads the sent response, the user device 102A, 102B or 102C sends a request to the feedback processing server 144 for the actual content of the response. The ERMS 106 may stop the first timer 138 and set the response-read flag 154D upon receipt of the request. The ERMS 106 may then deliver the content of the response to the user, through the content processing server 144. If the ERMS 106 does not receive a request for the actual response content within the first predetermined time period, it may perform an action 220. In one implementation, the first predetermined time period may be two days. In this implementation, the ERMS 106 gives the user two days to read the response before performing an action 220. Here, if the ERMS 106 receives a request for the actual response content within the first predetermined time period, it instead executes an action 214. In one implementation, a user of the device 122 may configure the first predetermined time period within the ERMS 106. The first predetermined time period may be modified in the ERMS 106 upon receipt of input from another user, such as a user of one of the devices 120A, 120B, or 120C. In one implementation, the ERMS 106 is also capable of automatically modifying the first predetermined time period without user intervention.

If the ERMS 106 receives the request for actual response content within the first predetermined time period, the ERMS 106 may track whether the user provides the feedback requested in the response within a second predetermined time period, in an action 214. For example, the ERMS 106 may set the second timer 140 once the request for actual response content is received. If the user replies to the request for feedback before the second timer 140 reaches the second predetermined time period, the ERMS 106 may set the feedback-provided flag 154E and perform an action 216. The second predetermined time period may be configured and/or modified in manners similar to those described above in reference to the first predetermined time period.

If the user does not reply to the request for feedback before the second timer 140 reaches the second predetermined time period, the ERMS 106 may instead perform an action 220. In one implementation, the second predetermined time period may be four hours. In this implementation, the ERMS 106 gives the user four hours after reading the message to reply to the request for feedback before the ERMS 106 performs an action 220.

In an action 216, the ERMS 106 evaluates feedback from the user and proceeds according to the feedback. For example, if the feedback from the user indicates that the response was helpful, the ERMS 106 may set the feedback-helpful flag 154F, set the case-closed flag 154I, "close out" the case in an action 218, and perform no further action related to the user email message and response. If the feedback from the user indicates that the response was not helpful, the ERMS 106 may leave the feedback-helpful flag 154F and the case-closed flag 154I cleared and instead perform an action 220.

In an action 220, the ERMS 106 evaluates feedback from the user or a lack of feedback on the part of the user. For example, the ERMS 106 may perform an action 220 because the user has not read the response within the first predetermined period of time. In that case, the ERMS 106 may load a business rule 134 to determine whether to send an additional response to the user. If, by executing the business rule 134, the ERMS 106 determines that no additional response is necessary, the ERMS 106 may close the case in an action 218, set the case-closed flag 154I and perform no further action. If, by executing the business rule 134, the ERMS 106 determines that additional response should be sent, the ERMS 106 may set the additional-response flag 154G. The ERMS 106 may also jump back to an action 206 by loading another business rule 134 to determine whether to automatically create the additional response or prompt a human agent to enter input for creating the additional response.

The ERMS 106 may also perform an action 220 because the user has read the response but has not replied with the requested feedback. In that case, the ERMS 106 may load a business rule 134 to determine whether to close the case in an action 218, or to send additional response to the user. If the ERMS 106 determines that additional response should be sent to the user, the ERMS 106 may set the additional-response flag 154G and jump back to an action 206 to determine, by executing a business rule 134, whether that response should be automatically created or created in response to input by a human agent.

The ERMS 106 may also perform an action 220 because the user read the response and provided feedback, and the response indicated that the response was not helpful. In that case, the ERMS 106 may load a business rule 134 to determine whether to send additional response to the user and whether that response should be created based on input from a human agent using one of the user devices 102A, 102B or 102C. If the ERMS 106 determines that additional response should be sent to the user, the ERMS 106 may set the additional-response flag 154G and jump back to an action 206 to determine, by executing a business rule 134, whether that response should be automatically created or created based on input from a human agent. In any of the cases described above, the ERMS 106 may set the manual-handling flag 154H if the ERMS 106 determines, by executing a business rule 134, that the response should incorporate human agent input.

FIG. 3 is a diagram of a graphical user interface (GUI) showing an email message 300 that can be created by the ERMS 106 shown in FIG. 1A or 1B. The message 300 may include a header 302, a body 304, and a request for feedback 306. The header 302 may include information about a sender, a recipient, a subject for the email message 300 and other information typically identified in the header of an email message.

The body 304 may include a summary of the user's message and a response to that message. The ERMS 106 may automatically create the response, or a human agent may enter input specifying the basis for the response. The response body 304 may include a reference to the request for feedback 306.

The request for feedback 306 may include a question regarding the quality and helpfulness of the response. It may include selectable icons 308 that the user can select to answer the question. The icons 308 may be selectable with a keyboard, a mouse, or another input device connected to the user device 102A, 102B or 102C that the user is employing to display the email message 300. In one implementation, when the user enters feedback, for example, by selecting an icon 308, the feedback is received by the ERMS 106. For example, if a user receives the response shown in FIG. 3 and selects the icon 308A—indicating that the response was not helpful—the ERMS 106 receives this feedback via the content processing server 144, according to one implementation. In this implementation, the feedback may be solicited by HTML instruction code in the response. In response to any received feedback, the ERMS 106 may run the message tracking application 136 to set a flag in the message tracking database 130. For example, the ERMS 106 may set a feedback-provided flag 154E, but leave clear the feedback-helpful flag 154F. The ERMS 106 may execute a business rule to interpret this combination of flags to mean that the response was not helpful and may proceed according to the method 200. The request for feedback may also include a text input field 310. The text input field may allow the user to enter a text-based comment and then to submit the comment by selecting a "submit" icon 312.

The email message 300 may include an attachment 314. The attachment could be any kind of document or link. For example, the attachment may include a service bulletin related to the subject of the user's message.

Figure 4:
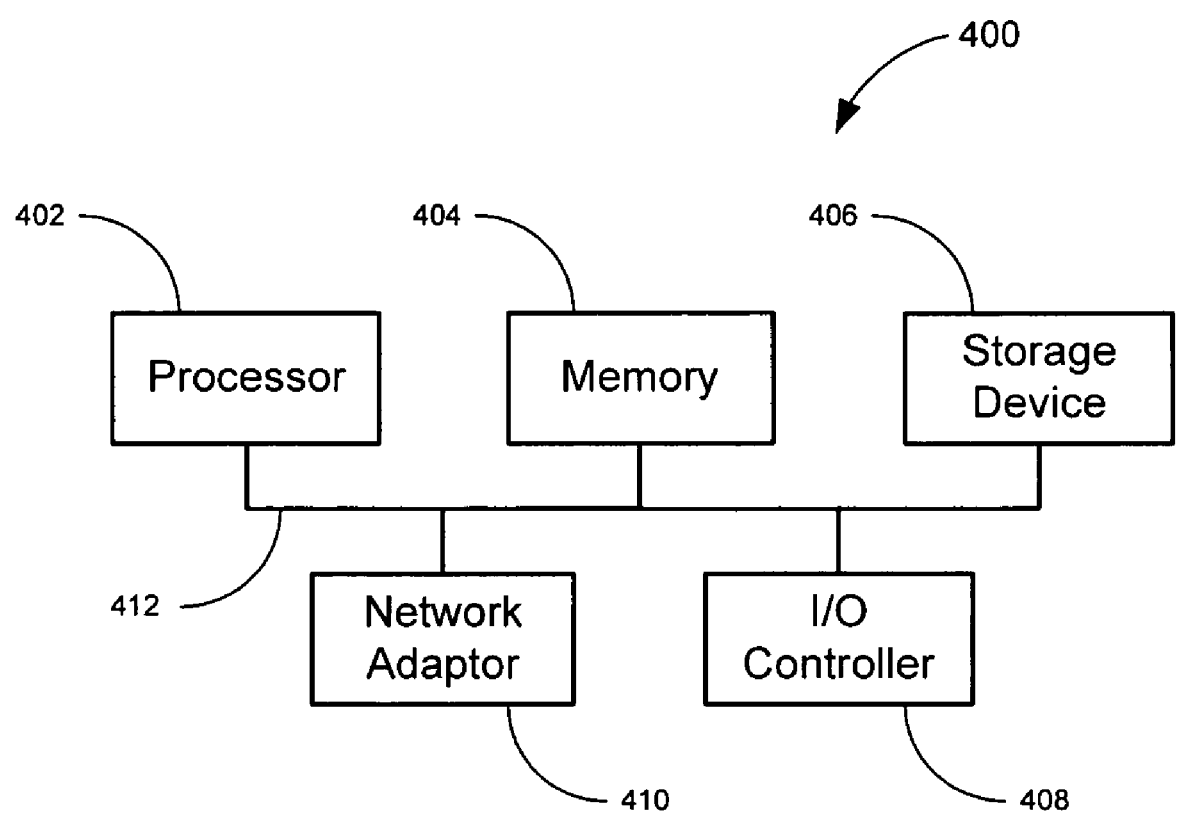
FIG. 4 is a block diagram of an exemplary computing device that may be included in user devices, agent devices, the supervisor device and the ERMS shown in FIG. 1A.

FIG. 4 is a block diagram of an exemplary computing device 400 that may be included in the user devices 102A-C, the agent devices 120-C, the supervisor device 122, or the ERMS 106 shown in FIG. 1A or FIG. 1B, according to one implementation.

The computing device 400 includes a processor 402, a memory 404, a storage device 406, an input/output controller 408, and a network adaptor 610. Each of the components 402, 404, 406, 408, and 410 are interconnected using a system bus 412.

The processor 402 is capable of processing instructions for execution in the computing device 400. In one implementation, the processor 402 is a single-threaded processor. In another implementation, the processor 402 is a multi-threaded processor. The processor 402 is capable of processing instructions stored in the memory 404 or on the storage device 406 to display graphical information for a graphical user interface (GUI) on an external input/output device that is coupled to the input/output controller 408.

The memory 404 stores information within the computing device 400. In one implementation, the memory 404 is a computer-readable medium. In one implementation, the memory 404 is a volatile memory unit. In another implementation, the memory 404 is a non-volatile memory unit.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer-readable or machine-readable medium, such as the memory 404, the storage device 406, or a propagated signal.

The input/output controller 408 manages input/output operations for the computing device 400. In one implementation, the input/output controller 408 is coupled to an external input/output device, such as a keyboard, a pointing device, or a display unit that is capable of displaying various GUI's, such as the GUI shown in FIG. 3, to a user.

The computing device 400 further includes the network adaptor 410. The computing device 400 uses the network adaptor 410 to communicate with other network devices. If, for example, the user device 102A includes the computing device 400, the computing device 400 uses its network adaptor 410 to communicate with the ERMS 106 over the WAN 104.

A number of implementations of the invention have been described. Nevertheless, it will be understood that various modifications may be made without departing from the spirit and scope of the invention. Accordingly, other implementations are within the scope of the following claims.

What is claimed is:

1. A computer-implemented method of replying to an incoming e-mail request, the method comprising:
   receiving, in an e-mail response system, an e-mail request for a solution that includes a description of a problem being experienced by a customer;
   processing the e-mail request using the e-mail response system, wherein processing the e-mail request comprises
      performing a computer content analysis of the received e-mail request,
      generating an auto-response, wherein the auto-response includes a proposed solution to the problem and a monitoring mechanism that causes a response-opened indicator to be sent to the e-mail response system when the auto-response is opened by the customer, and
      delivering the auto-response to the customer with a request for feedback about the efficacy of the proposed solution, the request for feedback including a selectable feedback option indicating that the proposed solution solved the problem being experienced by the customer;
   initiating a process within the e-mail response system wherein a user reviews the e-mail request to formulate a manual response with a second proposed solution upon determining that the response-opened indicator was received by the e-mail response system and that a predefined period of time has lapsed during which feedback indicating that the proposed solution solved the problem has not been received; and
   sending the manual response to the customer using the e-mail response system.

2. The method of claim 1, wherein delivering the auto-response to the customer comprises:
   storing the auto-response in a database;
   sending a link to the customer, the link referencing the auto-response that is stored in the database;
   receiving a request for the auto-response when the customer accesses the link; and
   sending the auto-response to the customer in response to the request.

3. The method of claim 2, wherein the auto-response stored in the database is updated before the customer accesses the link.

4. The method of claim 1, wherein the request for feedback includes hypertext markup language (HTML) instruction code.

5. A computer program product tangibly embodied in a machine-readable medium, the computer program product including instructions that, when executed, perform a method of replying to an incoming e-mail request, the method comprising:
   receiving, in an e-mail response system, an e-mail request for a solution that includes a description of a problem being experienced by a customer;
   processing the e-mail request using the e-mail response system, wherein processing the e-mail request comprises
      performing a computer content analysis of the received e-mail request,
      generating an auto-response, wherein the auto-response includes a proposed solution to the problem and a monitoring mechanism that causes a response-opened indicator to be sent to the e-mail response system when the auto-response is opened by the customer, and
      delivering the auto-response to the customer with a request for feedback about the efficacy of the proposed solution, the request for feedback including a selectable feedback option indicating that the proposed solution solved the problem being experienced by the customer;
   initiating a process within the e-mail response system wherein a user reviews the e-mail request to formulate a manual response with a second proposed solution upon determining that the response-opened indicator was received by the e-mail response system and that a predefined period of time has lapsed during which feedback indicating that the proposed solution solved the problem has not been received; and
   sending the manual response to the customer using the e-mail response system.

6. The computer program product of claim 5, wherein delivering the auto-response to the customer comprises:
   storing the auto-response in a database;
   sending a link to the customer, the link referencing the auto-response that is stored in the database;

receiving a request for the auto-response when the customer accesses the link; and sending the auto-response to the customer in response to the request.

7. The computer program product of claim 6, wherein the auto-response stored in the database is updated before the customer accesses the link.

8. The computer program product of claim 5, wherein the request for feedback includes hypertext markup language (HTML) instruction code.

* * * * *

UNITED STATES PATENT AND TRADEMARK OFFICE
CERTIFICATE OF CORRECTION

PATENT NO. : 7,657,600 B2
APPLICATION NO. : 11/027569
DATED : February 2, 2010
INVENTOR(S) : Gero Auhagen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this

Thirtieth Day of November, 2010

David J. Kappos
*Director of the United States Patent and Trademark Office*